United States Patent [19]

Torgent et al.

[11] Patent Number: 4,629,370
[45] Date of Patent: Dec. 16, 1986

[54] SPROCKET CUTTER AND METHOD OF ASSEMBLING

[75] Inventors: Douglas E. Torgent; Robert N. Mitchell, both of Raleigh, N.C.

[73] Assignee: Kennametal Inc., Latrobe, Pa.

[21] Appl. No.: 602,196

[22] Filed: Apr. 19, 1984

Related U.S. Application Data

[63] Continuation of Ser. No. 358,911, Mar. 17, 1982, abandoned.

[51] Int. Cl.⁴ .............................................. B26D 1/12
[52] U.S. Cl. ...................................... 407/29; 144/230; 144/241; 407/35; 407/49; 407/61; 407/114
[58] Field of Search ................... 144/218, 230, 241; 407/20, 27, 28, 29, 35, 43, 47, 48, 49, 58, 61, 62, 113, 114

[56] References Cited

U.S. PATENT DOCUMENTS

| | | | |
|---|---|---|---|
| Re. 20,722 | 5/1938 | Schmidt | 407/35 |
| 2,889,861 | 6/1959 | Kolimbat | 144/230 X |
| 3,103,736 | 9/1963 | Ortman, Jr. | 407/49 |
| 3,540,103 | 11/1970 | Saari | 407/48 |
| 3,574,251 | 4/1971 | Corti | 407/49 |
| 3,707,748 | 1/1973 | Price | 407/47 |
| 3,740,808 | 6/1973 | Shioya | 407/48 |
| 4,093,392 | 6/1978 | Hopkins | 407/48 |

FOREIGN PATENT DOCUMENTS

| | | |
|---|---|---|
| 1752586 | 6/1968 | Fed. Rep. of Germany . |
| 2006073 | 5/1979 | United Kingdom . |
| 307855 | 4/1970 | U.S.S.R. . |

Primary Examiner—W. D. Bray
Attorney, Agent, or Firm—John J. Prizzi

[57] ABSTRACT

Disclosed is a sprocket cutter in which there is a cutter body having a plurality of pockets along its periphery and a plurality of wedge recesses facing the periphery within each pocket. There is an array of inserts disposed within each of the pockets, each of the inserts having a cutting portion and a plurality of wedges equal in number to the number of inserts and wedge recesses. Each of the wedges is interposed between each of the inserts and each of the wedge recesses so that, as each of the wedges is moved inwardly into its corresponding wedge recess, each of the inserts is securely clamped between its corresponding wedge and the pocket. Each of the inserts is positioned so that the cutting portion of each insert extends beyond the periphery of the cutter body. Each of the inserts cuts a segment of the sprocket contour as the cutter body rotates with adjacent segments of the sprocket contour being cut by inserts located in different pockets. There is also a method of assembling the sprocket cutter.

8 Claims, 7 Drawing Figures

SPROCKET CUTTER AND METHOD OF ASSEMBLING

This is a continuation of application Ser. No. 358,911, filed Mar. 17, 1982, now abandoned.

BACKGROUND OF THE INVENTION

This invention is related to the field of metal cutting tools and, more specifically, to the field of milling cutters. Most specifically, this invention has application to a very special type of milling cutter especially useful in cutting sprockets.

As is known in the prior art, a sprocket cutter has a number of stations at which there are means for cutting the contour of a sprocket. The cutting means is typically a number of cutter buttons or round inserts with their cutting edges arranged in the shape of the sprocket contour. The inserts at each station are slightly displaced parallel to the axis of rotation from the inserts at every other station. In this way, a complete revolution will cause the entire sprocket contour to be contacted by the cutting edges of the inserts.

In the past, the inserts have been attached directly to the cutter body by means of screws or similar fastening means in conjunction with a hole in the center of the insert. See, for example, U.S. Pat. No. 3,540,103, A problem with this type of fastening means is that during use, the insert may wobble slightly, or even loosen, thereby causing loss of tolerance.

It is thus desirable to have an insert that will not loosen during use.

Another problem with the prior art is that, if the insert should break or become dislodged, the cutter body itself may be exposed to the workpiece. This can cause damage to the cutter body, a very expensive piece of equipment.

It is thus desirable to prevent damage to the cutter body.

Thus, it is an object of this invention to have a sprocket cutter in which the cutting inserts are rigidly held.

It is another object to have a sprocket cutter in which the inserts are resistant to loosing.

It is a further object to have a sprocket cutter in which the cutter body is prevented from damage due to a broken or dislodged cutting insert.

It is a still further object to have a sprocket cutter that will cut an accurate contour over long periods of use.

BRIEF SUMMARY OF THE INVENTION

According to the invention, disclosed is a sprocket cutter comprising a cutter body having a plurality of wedge recesses facing the periphery within each pocket. An array of inserts is disposed within each of the pockets, each of the inserts having a cutting portion. There is also a plurality of wedges equal in number to the number of inserts and wedge recesses. Each of the wedges is interposed between each of the inserts and each of the wedge recesses so that as each of the wedges is moved inwardly into its corresponding wedge recess, each of the inserts is securely clamped between its corresponding wedge and the pocket. Each of the inserts is positioned so that the cutting portion of each insert extends beyond the periphery of the cutter body. Each of the inserts cuts a segment of the sprocket contour as the cutter body rotates with adjacent segments of the sprocket contour being cut by inserts located in different pockets.

The sprocket cutter further comprises a plurality of cartridges corresponding to the number of cutter body pockets for insertion into each of the pockets. Each of the cartridges has an insert receiving portion and a rear portion. The cartridges are interposed in each pocket between the arrays of inserts and the pocket so that each of the inserts abuts the insert receiving portion and is securely clamped thereon by the wedges.

Preferably, the insert receiving portion comprises a plurality of insert seating positions equal in number to the number of inserts in the array of inserts. Each of the insert seating positions has a V-shaped surface for accurately receiving and locating each of the inserts.

Preferably, also, the insert receiving portion further comprises a shim recess and shim located rearwardly in the rotational sense from each of the insert seating positions so that the bottom of each of the inserts will abut the top of each of the shims.

Preferably, each of the pockets has a pair of locating surfaces abutting with a pair of locating surfaces on the rear portion of each of the cartridges. The pocket locating surfaces and the cartridge locating surfaces similarly converge toward the periphery of the cutter body.

It is most preferable that each of the wedges has a flat bearing surface for engagement with each of the inserts and a rounded surface opposite the flat bearing surface for engagement with a similarly rounded surface of the wedge recess.

Each of the pockets has a chip gash portion forward in the rotational sense of the array of inserts. The radius of the cutter body is reduced at each of the chip gash portions.

It is most preferable that each of the inserts is round.

According to the invention, there is also disclosed a cutter cartridge having an insert receiving portion and a rear portion. The insert receiving portion has plurality of insert seating position, each of which has a V-shaped surface for accurately receiving and locating a cutting insert.

It is preferable that the insert receiving portion also have a shim recess and shim located rearwardly in the rotational sense from each of the insert seating positions. It is also preferable that the rear portion of the cartridge has a pair of locating surfaces converging toward the insert receiving portion of the cartridge.

According to the invention, there is disclosed a method of assembling a sprocket cutter of the type having a cutting body having a plurality of pockets and wedge recesses, a plurality of cartridges equal in number to the number of pockets and having a rear portion, a plurality of insert seatng positions and shim recesses both equal in umber to the number of wedge recesses, and a plurality of wedges equal in number to the number of wedge recesses. The method comprises inserting a cartridge into a pocket of the cutter body and causing the two locating surfaces on the rear portion of the cartridge to abut two similar locating surfaces in the pocket, each of the two locating surfaces convering toward the periphery of the cutter body. A shim is located into each shim recess of the cartridge such that the shim protrudes slightly above the shim recess. An insert is then placed into each insert seating position and on top of each shim and each insert is then located with respect to a V-shaped locating surface at the rear of each insert seating position. The method further comprises interposing a wedge between each insert and each wedge recess such that, upon moving each wedge inwardly, each insert will be securely clamped. Each step of the method is repeated a number of times equal to the number of pockets in the cutter body.

BRIEF DESCRIPTION OF THE DRAWINGS

The exact nature of the present invention will become more clearly apparent upon reference to the following detailed specification taken in connection with the accompanying drawings in which.

DETAILED DESCRIPTION OF THE INVENTION

Figure 1:
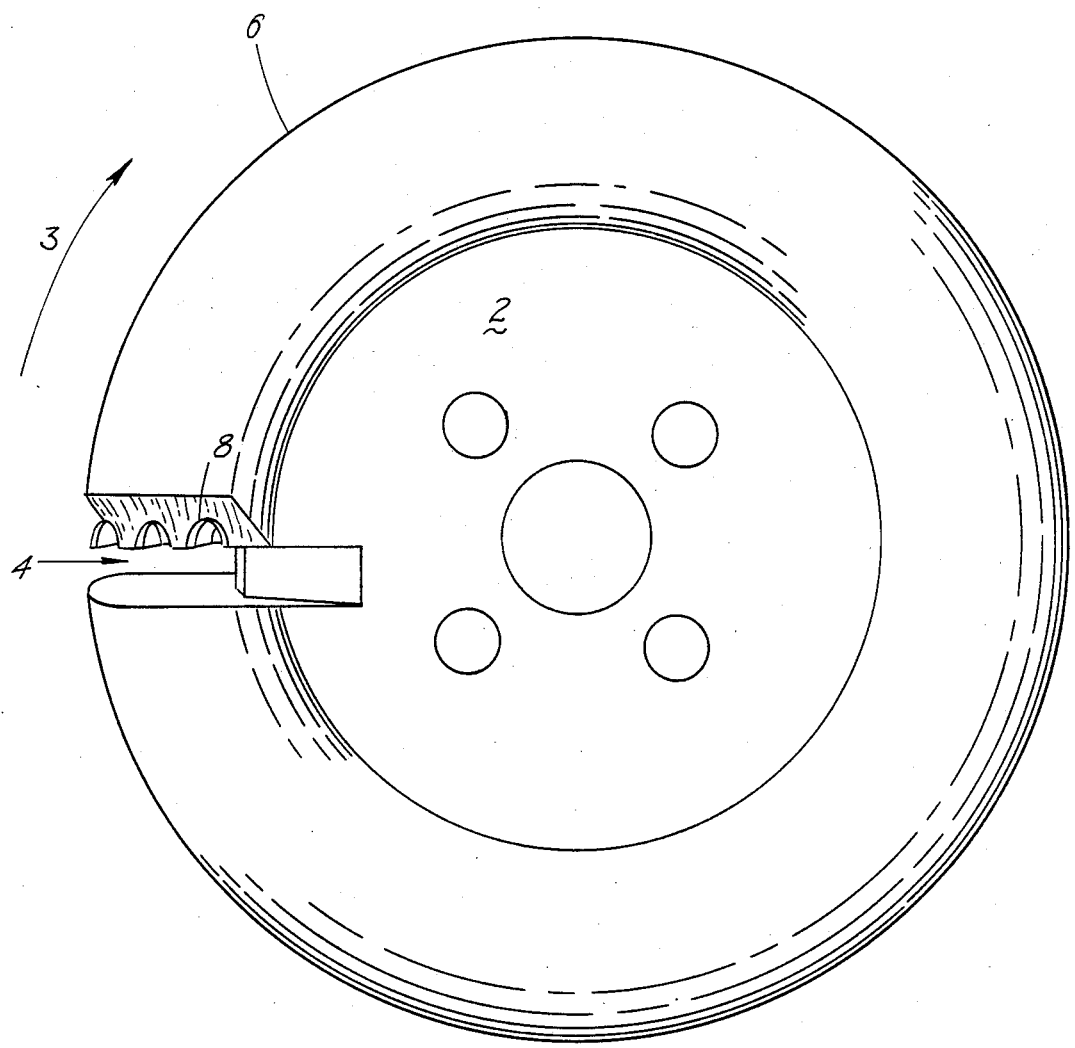
FIG. 1 is a side view of a cutter body showing one pocket.
Figure 2:
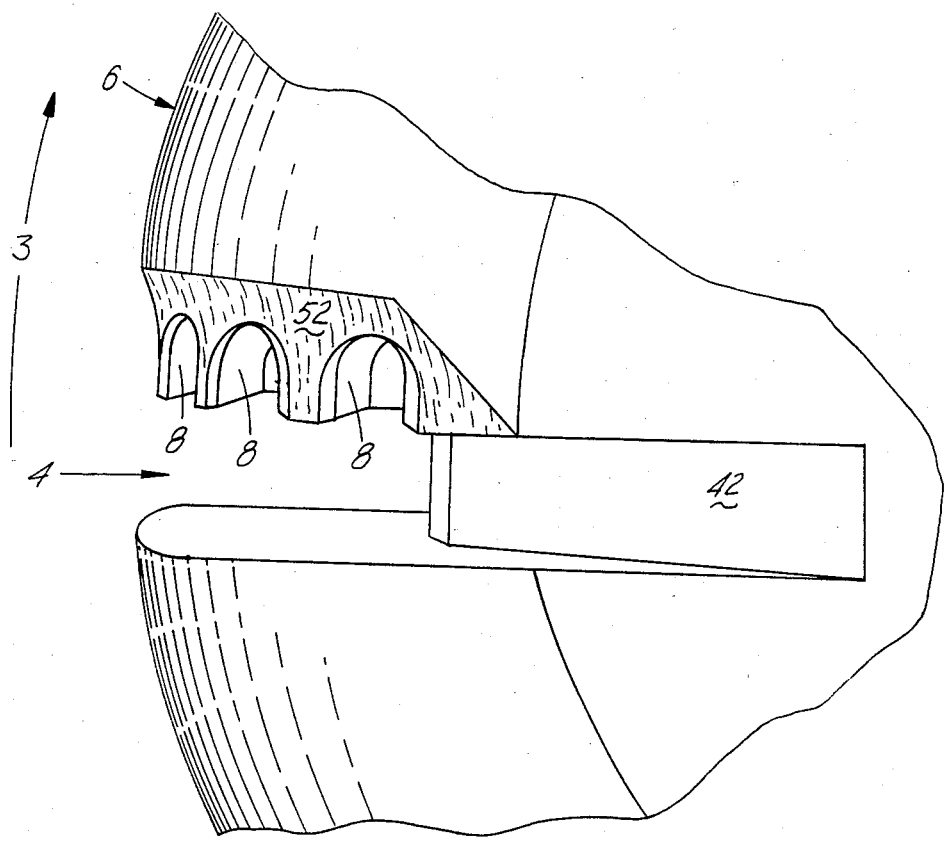
FIG. 2 is an enlarged view of the pocket in FIG. 1.
Figure 3:
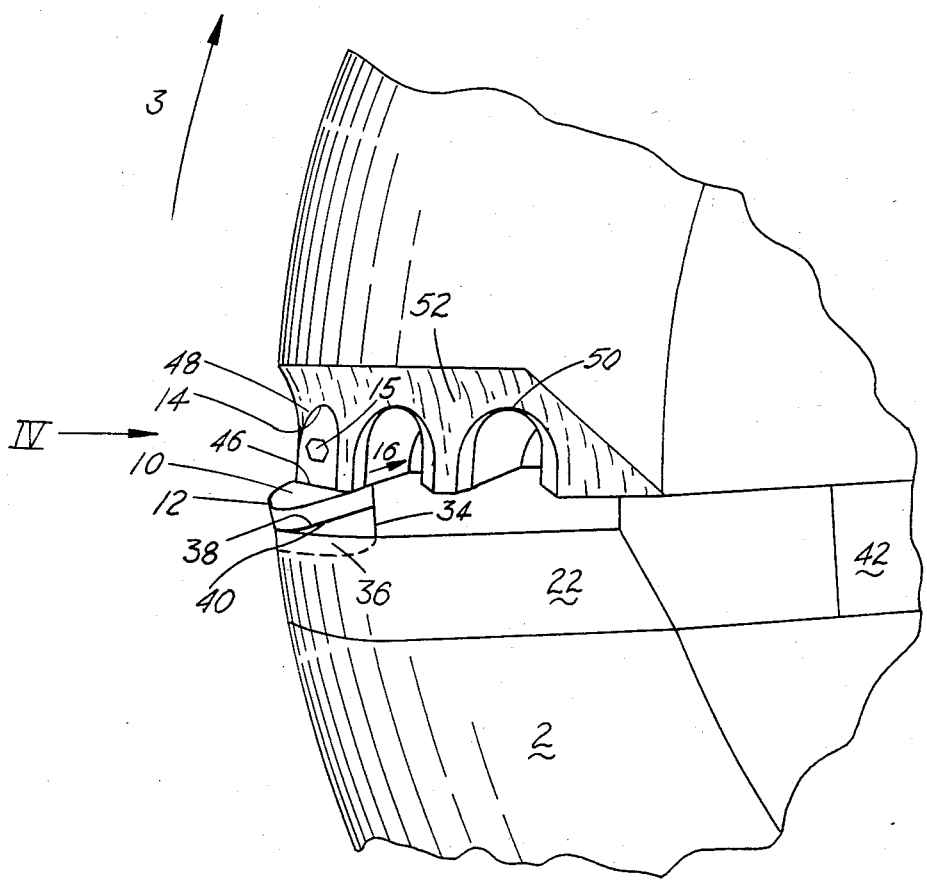
FIG. 3 is a view of the pocket of FIG. 2 with a cartridge but showing only one insert and one wedge.

Referring to the drawings more in detail, FIG. 1 illustrates the cutter body 2 with only one pocket 4 shown. In this invention, there are preferably 14 such pockets, but there may be any umber of pockets, depending upon the tolerance and surface finish required. The cutter body rotates in the direction of rotation 3.

Referring now to FIGS. 2 through 7, according to the invention, there is disclosed a sprocket cutter comprising a cutter body 2 having a plurality of pockets 4 along its periphery 6 and a plurality of wedge recesses 8 facing the periphery within each pocket. There is an array of inserts 10 disposed within each of the pockets, each of the inserts having a cutting portion 12. There is also a plurality of wedges 14 equal in umber to the number of inserts 10 and wedge recesses 8. Each of the wedges 14 is interposed between each of the inserts 10 and each of the wedge recesses 8 so that as each of the wedges is moved inwardly, as shown by arrow 16, into its corresponding wedge recess each of the inserts is securely clamped between its corresponding wedge and the pocket. Each of the inserts is positioned so that the cutting portion of each insert extends beyond the periphery of the cutter body. Each of the inserts cuts a segment of the sprocket contour 18 of the sprocket 19 as the cutter body rotates with adjacent segments of the sprocket contour being cut by inserts located in different pockets.

Figure 5:
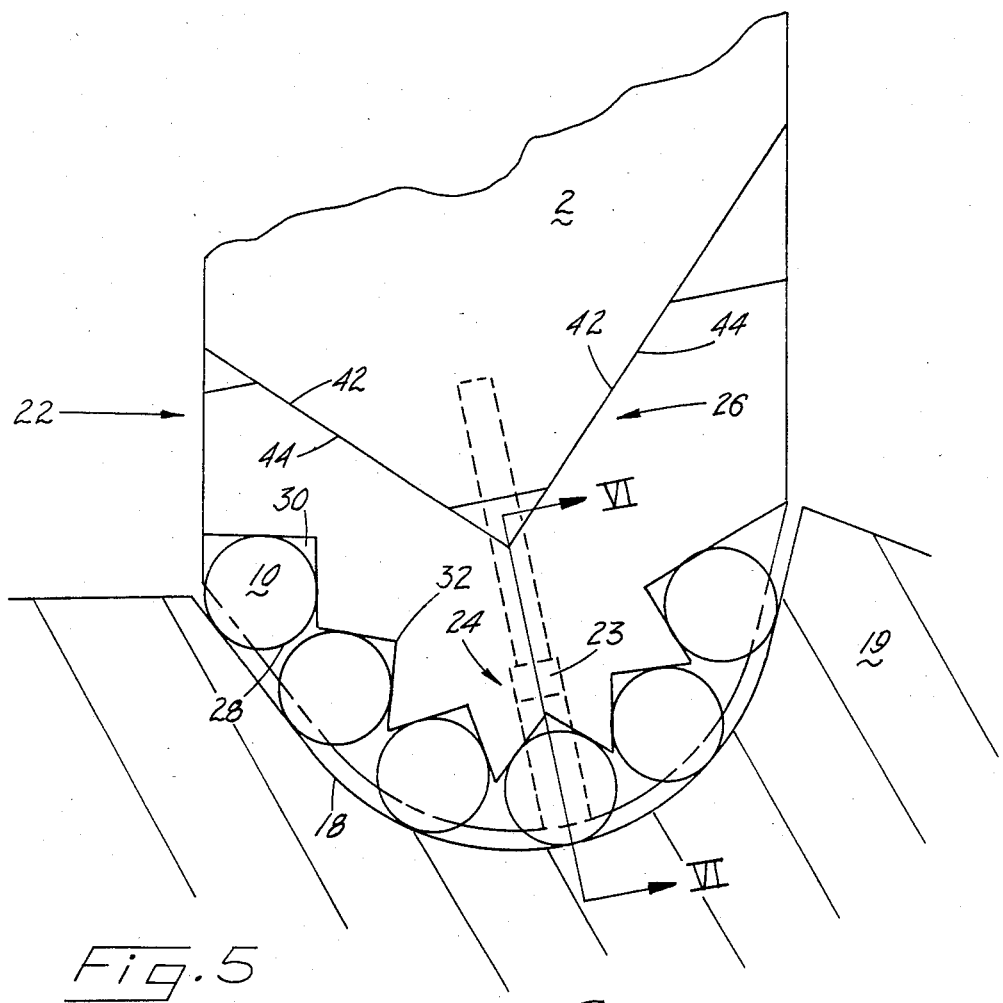
FIG. 5 is a view taken along the line V—V of FIG. 4.
Figure 6:
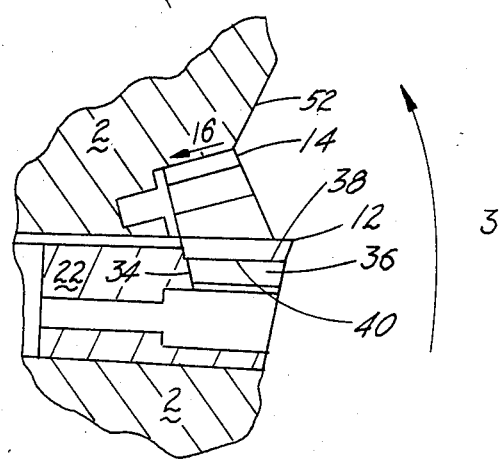
FIG. 6 is a view taken along the line VI—VI of FIG. 5.

The array of inserts within each station is the sum total of the individual positions of each insert. As shown in FIG. 5, the inserts are arrayed so as to form the shape of a sprocket contour. However, it is contemplated within the scope of this invention that the inserts may be arrayed to form any complex contour.

Figure 7:
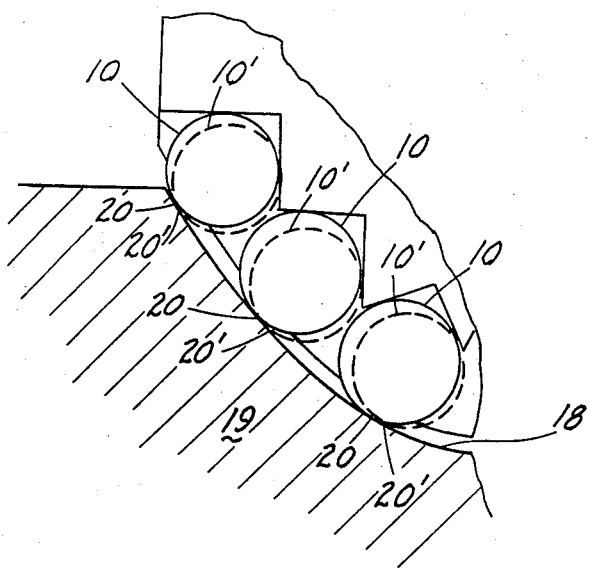
FIG. 7 is a partial view of the station shown in FIG. 5.

FIG. 7 shows a portion of the station of FIG. 5. A station is the cutter body pocket with its accompanying hardware. Inserts 10 each cut segment 20 from the sprocket contour 18. Some other station with inserts 10' shown in dotted lines in FIG. 7 would cut an adjacent segment 20' from the sprocket contour 18. Adjacent segments 20 and 20' would be cut by different stations which would not necessarily be adjacent. That is, the station that cuts segments 20' could be the one, but not necessarily so, that next follows the station that cuts segments 20.

There is a plurality of cartridges 22 corresponding to the number of cutter body pockets 4 for insertion into each of the pockets. Each of the cartridges has an insert receiving portion 24 and a rear portion 26. The cartridges are interposed in each pocket between the array of inserts and the pocket so that each of the inserts abuts 28, said insert receiving portion, and is securely clamped thereon by the wedges 14.

The cartridge may be securely held in the cutter body as by fastening means 23. The wedges may be moved inwardly and tightened as by fastening means 15.

Preferably, the insert receiving portion comprises a plurality of insert seating positions 30 equal in number to the number of inserts 10 in the array of inserts. Each of the insert seating positions has a V-shaped surface 32 for accurately receiving and locating each of the inserts.

Preferably, also, the insert receiving portion further comprises a shim recess 34 and shim 36 located rearwardly in the rotational sense from each of the insert seating positions so that the bottom 38 of each of the inserts will abut the top 40 of each of the shims 36.

Preferably, each of the pockets has a pair of locating surfaces 42 abutting with a pair of locating surfaces 44 of the rear portion 26 of each of the cartridges 22. The pocket locating surfaces 42 and the cartridge locating surface 44 similarly converge toward the periphery of the cutter body 2.

It is most preferable that each of the wedges has a flat bearing surface 46 for engagement with each of the inserts 10 and a rounded surface 48 opposite the flat bearing surface for engagement with a similarly rounded surface 50 of the wedge recess 8.

In the preferred embodiment, the wedges would firmly position the inserts against the cartridge, but it is within the scope of this invention to eliminate the cartridge and have the wedges securely clamp the inserts within the pocket itself. From a practical standpoint, it is desirable to make use of the cartridge so as to avoid expensive machining on the cutter body.

It is preferable that each of the pockets have a chip gash portion 52 forward in the rotational sense of the array of inserts. The radius of the cutter body is reduced at each of the chip gash portions 52.

It is most desirable to have a chip gash portion in that it allows movement of the cut chip away from the cutter body thereby preventing the washing away of the cutter body.

It is most preferred that each of the inserts is round.

Figure 4:
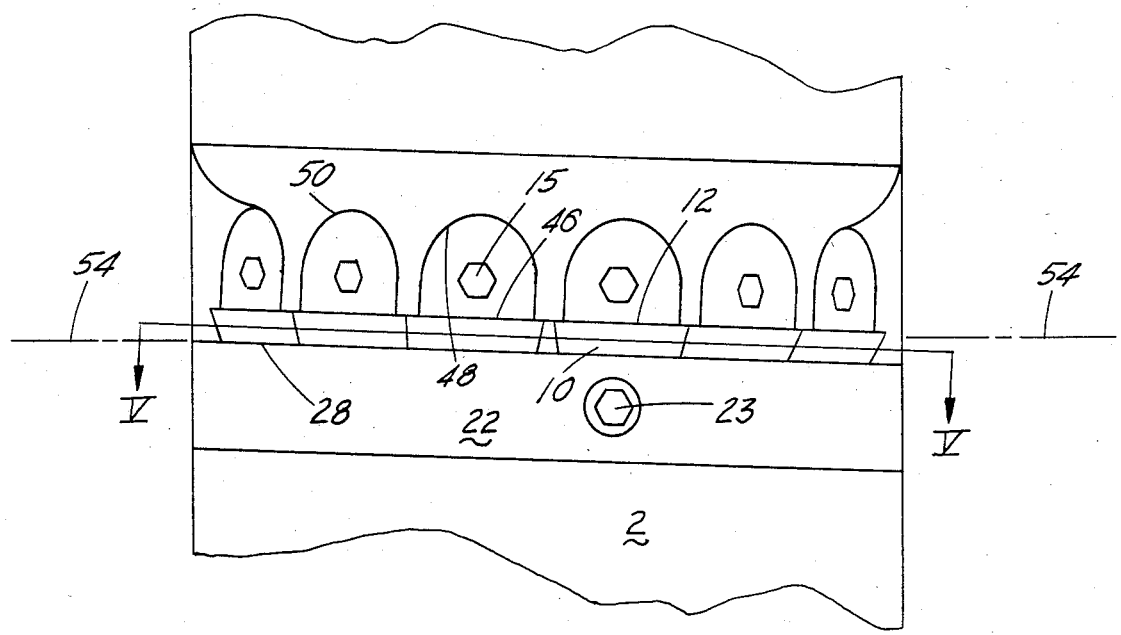
FIG. 4 is a view from the left of FIG. 3 showing a cartridge with a full array of inserts and corresponding wedges.

As best seen in FIG. 4, the inserts are slightly skewed so that their cutting portions are ot parallel to the axis of rotation 54 of the cutter body. It has been found that when the cutting portions of the inserts are at an angle to the axis of rotation, the possibility of chatter is eliminated.

According to the invention, there is a cutter cartridge, as a separate article of commerce, comprising an insert receiving portion 24 and a rear portion 26. Each insert receiving portion has a plurality of insert seating positions 30, each of which has a V-shaped surface for accurately receiving and locating a cutting insert.

Preferably, the insert receiving portion further comprises a shim recess 34 and shim 36 located rearwardly in the rotational sense from each of the insert seating positions. It is also preferable that the rear portion 26 of the cartridge has a pair of locating surfaces 44 converging toward the insert receiving portion 24 of the cartridge.

According to the invention, disclosed is a method of assebling a sprocket cutter of the type having a cutter body having a plurality of pockets and wedge recesses. It is also of the type having a plurality of cartridges equal in number to the umber of pockets and having a rear portion, a plurality of insert seating positions and shim recesses, both equal in number to the number of wedge recesses. The sprocket cutter is further of the type having a plurality of wedges equal in umber to the number of wedge recesses. The method comrpises inserting a cartridge 22 into a pocket 4 of the cutter body 2 and causing the two locating surfaces 44 on the rear portion 26 of the cartridge to abut two similar locating surfaces 42 in the pocket, each of the two locating surfaces converging toward the periphery of the cutter body, then locating a shim into each shim recess of the cartridge such that the shim protrudes slightly above the shim recess. The method further comprises placing an insert into each insert seating position 30 and on top of each shim 36 and locating each insert with respect to a V-shaped locating surface 32 at the rear of each insert seating position. A further step is interposing a wedge 14 between each insert and each wedge recess 8 such that upon moving each wedge inwardly as shown by arrow 16, each insert will be securely clamped. The method is completed by repeating each step a number of times equal to the number of pockets in the cutter body.

Modifications may be made within the scope of the appended claims.

What is claimed is:

1. A sprocket cutter comprising: a cutter body having a plurality of pockets along its periphery and a plurality of wedge recesses facing said periphery within each pocket; an array of inserts disposed within each of said pockets, each of said inserts having a cutting portion; and a plurality of wedges equal in number to the umber of inserts and wedge recesses, each of said wedges interposed between each of said inserts and each of said wedge recesses so that as each of said wedges is moved inwardly into its corresponding wedge recess, each of said inserts capable of being securely clamped between its corresponding wedge and said pocket, each of said inserts capable of being positioned so that said cutting portion of each insert extends beyond the periphery of said cutter body, each of said inserts aligned for cutting a segment of the sprocket contour as said cutter body rotates with adjacent segments of the sprocket contour being cut by inserts located in different pockets, and a plurality of cartridges corresponding to the number of cutter body pockets for insertion into each of said pockets, each of said cartridges having an insert receiving portion and a rear portion, said cartridges being interposed in each pocket between said array of inserts and said pocket so that each of said inserts abuts said insert receiving portion and is securely clamped thereon by said wedges.

2. The sprocket cutter of claim 1 wherein said insert receiving portion comprises a plurality of insert seating positions equal in number to the umber of inserts in said array of inserts, each of said insert seating positions having a V-shaped surface for accurately receiving and locating each of said inserts.

3. The sprocket cutter of claim 2 wherein said insert receiving portion further comprises a shim recess and shim located rearwardly, in the rotational sense, from each of said insert seating positions so that the bottom of each of said inserts will abut the top of each of said shims.

4. The sprocket cutter of claim 3 wherein each of said pockets has a pair of locating surfaces abutting with a pair of locating surfaces of said rear portion of each of said cartridges, said pocket locating surfaces and said cartridge locating surfaces similarly converging toward said periphery of said cutter body.

5. The sprocket cutter of claims 1 or 4 wherein each of said wedges has a flat bearing surface for engagement with each of said inserts and a rounded surface opposite said flat bearing surface for engagement with a similarly rounded surface of said wedge recess.

6. The sprocket cutter of claim 5 wherein each of said pockets has a chip gash portion forward, in the rotational sense, of said array of inserts, the radius of said cutter body being reduced at each of said chip gash portions.

7. The sprocket cutter of claim 6 wherein each of said inserts is round.

8. A method of assembling a sprocket cutter of the type having a cutter body having a plurality of pockets and wedge recesses, a plurality of cartridges, equal in number to the number of pockets, and having a rear portion, a plurality of insert seating positions and shim recesses, both equal in number to the number of wedge recesses, and a plurality of wedges equal in number to the number of wedge recesses, comprising: inserting a cartridge into a pocket of the cutter body and causing the two locating surfaces on the rear portion of the cartridge to abut two similar locating surfaces in the pocket, each of the two locating surfaces in the pocket converging toward the periphery of the cutter body; locating a shim into each shim recess of the cartridge such that the shim protrudes slightly above the shim recess; placing an insert into each insert seating position and on top of each shim and locating each insert with respect to a V-shaped locating surface at the rear of each insert seating position; interposing a wedge between each insert and each wedge recess such that upon moving each wedge inwardly, each insert will be securely clamped; repeating each step a number of times equal to the number of pockets in the cutter body.

* * * * *